United States Patent [19]

Prigge et al.

[11] Patent Number: 4,892,568

[45] Date of Patent: Jan. 9, 1990

[54] PROCESS FOR REMOVING N-TYPE IMPURITIES FROM LIQUID OR GASEOUS SUBSTANCES PRODUCED IN THE GAS-PHASE DEPOSITION OF SILICON

[75] Inventors: Helene Prigge, Unterschleissheim; Robert Rurländer, Halsbach; Michael Schwab, Neuötting; Hans P. Bortner; Andreas Englmüller, both of Burghausen, all of Fed. Rep. of Germany

[73] Assignee: Wacker-Chemitronic Gesellschaft fur Elektronik-Grundstoffe mbH, Burghausen, Fed. Rep. of Germany

[21] Appl. No.: 293,750

[22] Filed: Jan. 3, 1989

[30] Foreign Application Priority Data

Feb. 19, 1988 [DE] Fed. Rep. of Germany ....... 3805282

[51] Int. Cl.$^4$ ............................................. B01D 53/14
[52] U.S. Cl. ........................................... 55/73; 55/71; 55/89; 55/95; 423/342
[58] Field of Search ....................................... 55/71–74, 55/89, 95; 423/210, 248, 299, 322, 342, 347

[56] References Cited

U.S. PATENT DOCUMENTS

| | | | |
|---|---|---|---|
| 2,971,607 | 2/1961 | Caswell | 55/73 |
| 2,987,139 | 6/1961 | Bush | 55/73 |
| 3,031,268 | 4/1962 | Shoemaker | 423/347 |
| 3,148,042 | 9/1964 | Harnisch et al. | 55/73 X |
| 3,163,590 | 12/1964 | Litz et al. | 423/342 X |
| 3,405,508 | 10/1968 | Peters et al. | 55/73 |
| 3,446,605 | 5/1969 | Finholt | 423/299 |
| 3,790,459 | 2/1974 | Kotzsch et al. | 423/342 X |
| 4,097,584 | 6/1978 | Reuschel et al. | 423/299 X |
| 4,374,110 | 2/1983 | Darnell et al. | 423/342 |
| 4,409,195 | 10/1983 | Darnell et al. | 423/342 |
| 4,454,104 | 6/1984 | Griesshammer et al. | 423/349 |
| 4,481,178 | 11/1984 | Kray | 423/342 |
| 4,532,120 | 7/1985 | Smith et al. | 423/347 |
| 4,565,677 | 1/1986 | Yusa | 423/347 X |

FOREIGN PATENT DOCUMENTS

| | | | |
|---|---|---|---|
| 59-137312 | 8/1984 | Japan | 423/342 |
| 59-224119 | 12/1984 | Japan | 423/342 |
| 975000 | 11/1964 | United Kingdom . | |

*Primary Examiner*—Robert Spitzer
*Attorney, Agent, or Firm*—Collard, Roe & Galgano

[57] ABSTRACT

The liquid or gaseous substances, such as hydrogen or trichlorosilane, encountered in the gas-phase deposition of silicon may contain n-type doping impurities which can be removed by adduct formation with silicon, titanium or tin halides. The impurities can be liberated from the adducts by thermal treatment and finally removed. The halides left behind are capable of again forming adducts and are again used to remove the impurities. The process can consequently be operated cyclically and is remarkable for the low quantity of chemicals required and for its ecological harmlessness.

10 Claims, 1 Drawing Sheet

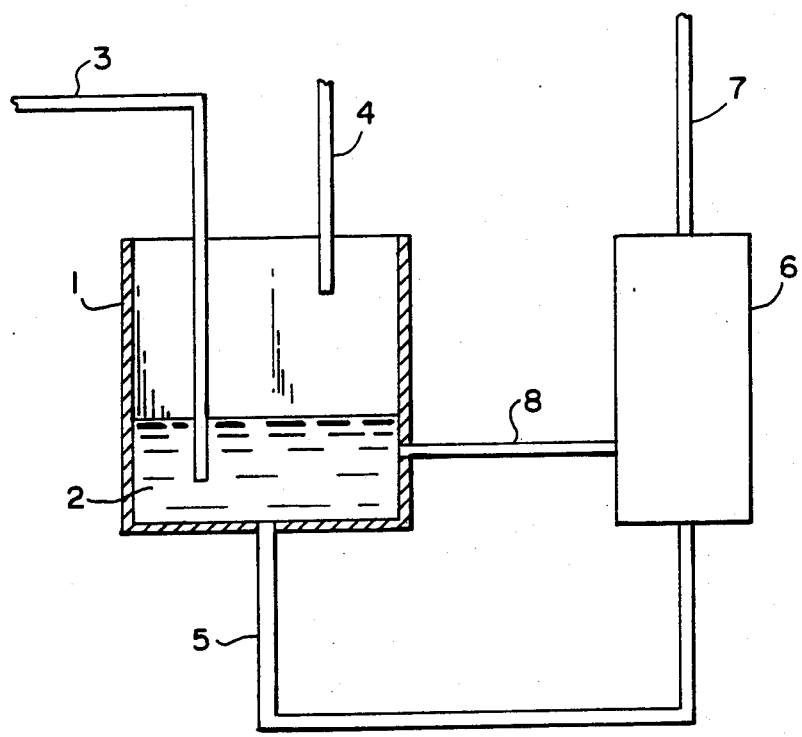

PROCESS FOR REMOVING N-TYPE IMPURITIES FROM LIQUID OR GASEOUS SUBSTANCES PRODUCED IN THE GAS-PHASE DEPOSITION OF SILICON

BACKGROUND OF THE INVENTION

1. The Field of the Invention

The invention relates to a process for removing n-type doping impurities from liquid or gaseous substances or substance mixtures produced in the gas-phase deposition of silicon.

2. Description of the Prior Art

It is well known that for the production of polycrystalline high-purity silicon by gas-phase deposition, one must utilize substances having the highest possible purity. This is true whether the production process is for example by decomposition of volatile silicon compounds on heated silicon substrates by the Siemens process or on silicon particles in fluidized bed processes. In particular, the basic requirement is that electrically active impurities must be excluded as far as possible because these impurities may act as an undesired doping. In this connection, special attention must be paid to n-type doping impurities which may occur, for example, in the form of volatile compounds of elements of the fifth main group of the periodic system. These are, for example, halogens or, in particular, hydrogen compounds of phosphorus or arsenic.

Sources of such impurities may be, for example, starting materials such as the fragmented silicon raw material which is reacted with hydrogen chloride to produce trichlorosilane. The fragmented silicon is in general comminuted with steel jaw crushers and may be contaminated in the process with grit composed of, for example, phosphorus-containing steel. Furthermore, the silicon raw material itself may initially contain small traces of phosphorus or arsenic. Traces of such impurities may also be absorbed in small amounts from the stainless steel vessel walls or pipelines. This is because the starting or final products encountered in liquid or gas form in the silicon gas-phase deposition process are frequently very aggressive substances, such as silanes, halosilanes, silicon halides, hydrogen chloride or hydrogen.

The actual deposition reaction includes, for example, a mixture of hydrogen and liquid or gaseous trichlorosilane which mixture is reacted to form elementary silicon (in addition to large quantities of silicon tetrachloride, hydrogen chloride and also unreacted starting compounds). A lower amount of the n-type doping impurities are incorporated in the silicon deposited in this reaction owing to the various distribution equilibria and therefore undergo enrichment in the gas phase. This intrinsically favorable effect has, however, an undesirable result if the per se valuable gases produced as final products are intended to be recycled into the deposition process. This is because the enrichment then increases to an ever greater extent and finally results in an intolerable contamination.

An example of this is the so-called "tetra-conversion" in which the silicon tetrachloride produced is reconverted in a cyclic process into trichlorosilane which can then again be fed into the deposition reactor (see U.S. Pat. No. 4,536,642). Such an enrichment can also be produced in processes in which the unreacted hydrogen (for example, in accordance with U.S. Pat. No. 4,454,104) is fed back into the deposition reactor. In many cases, therefore, the use of such cyclic processes, which are desirable for cost reasons due to the considerable reduction in material consumption and also for environmental protection reasons, are either dispensed with entirely or used only occasionally in the gas-phase deposition of high-purity silicon.

A known process is disclosed in No. GB-A-975,000 by which liquid halosilanes or halogermanes can be freed of phosphorus-containing impurities such as phosphorus hydride or phosphorus trichloride. This patent teaches the conversion of the phosphorous containing impurities in a first step to the pentavalent state and then reacting them with added liquid titanium tetrachloride or tin tetrachloride, in which process a solid complex is formed which can eventually be removed. This process is restricted, however, to only liquid components and is expensive since it requires not only an oxidation step but also the careful separation of the liquid mixture formed after separating the solid complex. This process also makes no provision for the reuse of the reagents involved.

SUMMARY OF THE INVENTION

It is an object of the invention to provide a simplified process utilizing halides for removing n-type doping impurities from both liquid and gaseous substances or mixtures thereof produced in the gas-phase deposition of silicon.

It is yet another object of the invention to provide a process which is low in cost, has a low demand for chemicals and which can be operated in an environmentally safe manner.

Accordingly, these and related objects are achieved by a process which comprises passing the substances through a purification station in which they are brought into contact with halides of the elements silicon, titanium or tin. These halides are supplied under conditions in which the impurities therein are removed by the formation of adducts. At least a part of the halides supplied are subjected to a thermal treatment in a regeneration station, at the latest when they are saturated with adducts. In this treatment, the adducts are at least partly dissociated and the impurities liberated in the process are removed. Then the regenerated halides are again brought into contact with the substances to be purified in the purification station optionally after adding fresh halides.

Suitable halides are the chlorides and/or bromides of the elements mentioned, that is to say, for example, the tetrachlorides or tetrabromides of titanium or tin. Silicon chlorides which have at least two atoms of silicon in the molecule have proven to be particularly beneficial and more specifically, those which can be supplied in liquid form. As examples, silicon chlorides of the formula $Si_nCl_{2n+2}$, where n=2 to 4, may be used individually or as a mixture. Silicon tetrachloride which is produced, for example, in the required high purity as a by-product in the deposition of silicon, is frequently added as an additional mixture component. The higher silicon chlorides mentioned also occur, for example, as by-products in the form of so-called "high boilers" in the production of trichlorosilane by reacting hydrogen chloride with elementary silicon. These higher silicon chlorides may be isolated from the mixture by distillation for example. Such high-boiling mixtures also frequently contain dissolved fractions of higher silicon chlorides which do not disturb their effectiveness when used with the present invention. Despite their high sensitivity to oxidation, the advantage of the silicon halides and, in particular, the silicon chlorides, is that they are available in the highest purity and contain only elements which are already present in the gases encountered in the deposition of silicon. Thus, there is a low risk of entrainment of impermissible impurities which would have to first be removed by expensive separation measures.

In order to ensure the most reliable and complete binding of the impurities as possible by adduct formation, temperature conditions are required in the purification station which guarantee both an adequate adduct formation rate and also an adequate thermal stability of the adducts. A value of approximately 40° C. has usually proven to be the permissible upper limit, while the permissible lower limit when liquid halides are fed in, as preferred, is basically set by the freezing point of the halides or halide mixture used in the particular case. In the case of hexachlorodisilane, this temperature is, for example, about 2.5° C., in the case of octachlorotrisilane it is about −76° C., and can be varied, optionally, by mixing, such as by adding a silicon tetrachloride fraction. Of course, in setting the temperature, care has to be taken to ensure that none of the components contained in the gases to be purified condense out or are even frozen out. The required temperature can be set, for example, by a thermostat in the purification station and can be monitored, for example, by means of a temperature sensor attached to the outside wall of the vessel. Preferably, temperatures in the range between about −20° C. and room temperature, i.e., about 25° C., will be maintained. Because readily available media, such as, for example, unheated water or ice/common salt mixture can then be used for cooling, the costs can consequently be kept very low.

In principle, however, it is also possible to feed in the halides in the solid state. This may be accomplished, for example, by depositing them as a liquid, suspension or solution on a solid carrier substance. This is done, for example, by brushing or spraying them on and solidifying either by depositing them from the gas phase or applying them in solid form. This variant is especially useful when silicon halides are used which contain more than 4 atoms of silicon in the molecule and which are no longer present in the liquid form, but are in the solid form under the conditions prevailing in the purification station. Suitable carrier substances are inert substances and substances which do no contaminate the substances to be purified, such as particles or molded bodies composed of high-purity silicon or quartz. The advantage of this procedure is that the halides can be prepared with a large effective surface while, on the other hand, their retention is inexpensive because of the low vapor pressure.

Generally, reaction vessels which permit an absorptive substance exchange between the phases involved can be used as a purification station. For example, a gas phase can simply be fed into the liquid halide provided, for example, in a gas-washing bottle via one or more gas inlet tubes with a frit plate. Another and frequently preferred method is, for example, to bring the gas and liquid phase into contact in an arrangement in which the two phases are advantageously conveyed in opposite directions, as, for instance, in a trickle washer. Optionally, several washing devices may also be connected in series with each other. If the substances to be purified are present in liquid form, which may be the case, for example, with trichlorosilane, a distillation column is best used as a purification station with liquid halides being fed into its bottom.

During the distillation, the purified trichlorosilane can then be removed at the column head, while the impurities undergo enrichment in the bottom. For regeneration purposes, the sump can be completely or partially discharged and transferred to the regeneration station. This discharge can take place either continuously or cyclically. An excellent method is to draw off the distillate from one or more trays in the lower region of the column and feed it back again into the bottom of the column via the regeneration station. Such distillation processes associated with a removal of n-type doping impurities can, in principle, be carried out at atmospheric pressure, increased pressure or even under a vacuum. The decisive factor is that the temperature is not raised into the range in which more adducts are decomposed than are newly formed.

The n-type doping impurities present are removed from the substances to be purified by the formation of adducts with the halides fed in, which presumably proceeds in the fashion of a Lewis acid/base reaction, and are retained in the halide phase. These adducts are produced with the halides of titanium and tin, mostly in solid form, and this can sometimes make their removal from the purification station difficult, particularly if they are deposited on the vessel walls. The liquid halides of silicon used preferentially bind the n-type doping impurities in the form of liquid adducts which remain dissolved in the liquid phase and which can then be easily removed from the purification station.

In principle, the purification step can be carried out with one and the same halide phase until the saturation degree of the latter is reached and further adducts can no longer be formed. This point can be detected, for example, by the fact that the level of the n-type doping impurities rises in the gas stream emerging from the purification station. This can be monitored, for example, with the aid of highly sensitive gas detectors. It is preferable and more beneficial within the scope of the present invention, to utilize less than the maximum capacity of the, for example, liquid halides to form adducts in order to keep the risk of a breakthrough of the impurities low. For this purpose, the optimum duration of use can be determined, for example, in accordance with the impurity content of the substance to be purified. The adduct-forming capacity of the halide used can, in a particular case, possibly be determined by preliminary experiments.

The halides supplied and enriched with adducts are regenerated no later than at saturation in order to liberate the bound impurities so as to be available for use in the purification station. It is even better if this regeneration is performed at an earlier stage when the adduct formation has reached about 50–90% of the maximum achievable value. This can be carried out in a surprisingly simple manner by applying heat, and specifically by raising the temperature of the liquid or solid phase above a particular limit value above which a marked decomposition of the adducts sets in. For adducts of n-type doping impurities such as, for instance, phosphorus hydride or arsenic hydride with silicon halides, this limit value has been found to be about 60° C. Above this temperature it is possible to achieve an almost quantitative separation of, for example, the previously bound phosphorus hydride or arsenic hydride which can then be discharged from the regeneration station, for example, with the aid of an inert gas stream. After this treatment, the low-adduct halides prepared again have the capability of binding n-type doping impurities and may be reused in the purification station, possibly after adding fresh, unused halide.

In principle, the temperature during the regeneration can be increased up to the boiling point of the halide or halide mixture used in a particular case. In this temperature range, however, the danger of losses due to evaporating halides increases, unless suitable retention devices are provided. As a rule, therefore, as low a temperature as possible, preferably in the range of 60°-90° C., is used to keep losses low or to keep expenses involved in avoiding these losses low. Frequently, the use of mixtures has also proven successful in this connection since it is then possible to utilize both the effect of raising the boiling point and of depressing the freezing point. Thus, for example, adding about 10°-30° by weight of silicon tetrachloride to hexachlorodisilane can lower the relatively high melting point (approximately 2.5° C.) of the hexachlorodisilane to such an extent that it is possible to work in the beneficial range of down to about −20° C. in the purification station. At the same time, the boiling point of the mixture is increased so that it is not necessary to contend wit too rapid an evaporation of the silicon tetrachloride (boiling point approximately 57.6° C.) even at a regeneration temperature of, for example, 60°-65° C. The time necessary for a regeneration to the extent desired in a particular case is optimally determined on the basis of preliminary experiments and can be adjusted accordingly.

Suitable regeneration stations are arrangements which make it possible to supply and remove a liquid phase and to expose the latter to the action of a certain temperature or temperature sequences. Such stations also allow gaseous products produced in the process to escape in a controlled manner, possibly with retention of vapors of the liquid. Such arrangements may be designed, for example, in the form of a reflux condenser or a column in which the halides to be regenerated and present, for example, in liquid form are heated under reflux for a predetermined time. Under these conditions, the adducts are decomposed and the n-type doping impurities are liberated into the gas phase and may be discharged from the regeneration station, possibly with the aid of an inert gas stream. It is possible to proceed in an analogous manner if temperatures below the boiling point are employed. The regenerated liquid halides left behind can finally be reintroduced into the purification station. In principle, it is also possible to establish pressure values deviating upwards or downwards from normal pressure in the process steps mentioned.

The impurities, such as, phosphorus hydride or arsenic hydride, may then be bound in a downstream trapping station with the aid of suitable washing or filtering media. This may be done, for example, by passing the gas stream leaving the regeneration station into a washer charged with sodium hypochlorite or potassium hypochlorite solution. If inert carrier gases are used, as a rule nitrogen or noble gases such as argon, the gas stream can then be passed through the regeneration station again. Consequently, it is also possible to keep the release of any environmentally harmful compounds produced extremely low. Another possibility is to accumulate the impurities, often produced in high purity, in the trapping station, which chemicals are intrinsically valuable for utilization elsewhere.

The process of the present invention can be carried out in a manner such that a purification station is incorporated in the stream of the gas or gas mixture to be purified. The liquid halides supplied from the purification station can be continuously or cyclically introduced for regeneration into a separate regeneration station. A corresponding quantity of regenerated material, which may possibly be supplemented with fresh, liquid halides, is fed back from the separate regeneration station to the purification station. Variations are also conceivable in which the purification and regeneration are carried out consecutively in one and the same station. In that case, the purification step is conducted at a suitably low temperature and then, after shutting off the gas stream to be purified, the temperature is suitably increased and the regeneration step is carried out. Subsequently, the gas stream to be purified can be reintroduced into the single station. If two or more arrangements of the type having the combined purification and regeneration stations are provided in parallel, the gas stream to be purified does not need to be shut off. The gas stream can be passed through the station operating in the purification mode, while regeneration can be carried out in parallel therewith. Such a procedure is advisable especially in those cases in which the purification step produces solid adducts which are difficult to remove from the purification station, for example, because they adhere to the vessel wall. The variations mentioned here are to be understood only in the sense of examples, and not, however, in the sense of restrictions. They can also be extrapolated analogously to those cases in which the substance to be purified is present in a liquid form or the halide is present in a solid form.

By using the process of the present invention it is possible to remove n-type doping impurities, in particular those based on phosphorus and/or arsenic compounds, from substances or substance mixtures, which contain, in particular, hydrogen, trichlorosilane or silicon tetrachloride, as main constituents, encountered in liquid or gas form in the gas-phase deposition of silicon. This process can be performed in a simple and environmentally safe manner.

BRIEF DESCRIPTION OF THE DRAWING

The FIGURE shows a schematic arrangement of an apparatus for carrying out the process of the present invention.

DESCRIPTION OF THE PREFERRED EMBODIMENT

In the FIGURE, a schematic view of the process is given by way of example. A purification station 1 is provided with liquid halides 2, through which a stream of gas or gas mixture to be purified enters at feed conduit 3, leaving the purification station via outlet conduit 4 and is purified by adduct formation. The liquid halides 2 containing the adducts formed are continuously and cyclically introduced into a separate regeneration station 6 via outlet duct 5. There, the adducts are decomposed, and the impurities set free can leave the regeneration station 6 by outlet tube 7 and can be directed to a trapping station, (not shown). The regenerated halides are reintroduced into the purification station 1 via conduit 8 and can again purify the streams of gas by adduct formation.

The invention will now be explained more fully in a number of examples which are, however, only given by way of illustration and not of limitation.

EXAMPLE 1

Liquid hexachlorodisilane or hexachlorodisilane/silicon tetrachloride mixtures were supplied in a quantity of approximately 100 ml to a purification station designed as a temperature-controlled gas washer. The temperatures and mixture ratios established are shown in the Table.

A stream of hydrogen which contained various fractions of phosphorus hydride or phosphine ($PH_3$) and which corresponded in its composition to the gas mixtures encountered in producing silicon after separating off the chlorosilanes and the hydrogen chloride present was passed through the gas washer. The $PH_3$ content of the gas stream was determined before and after the passage through the purification station with the aid of gaschromatographic methods. From this difference and the flow rate established in each case, it was possible to estimate the time necessary for reaching an adduct formation level of about 75% of the maximum value determined in preliminary experiments. The values measured under these circumstances are set forth in the Table.

The liquid contained in the gas washer was now introduced via a supply line into the regeneration station. A receiving container was provided with a condenser and its temperature was controlled to the temperature specified in the Table. At the same time, the corresponding quantity of regenerated liquid was returned to the purification station from the regeneration station so that the purification process could be continued in an analogous manner using this charge. Both streams of liquid were passed in opposite directions through a counter flow heat exchanger so that they were able to mutually precool or preheat each other.

phase. This adduct formation was continued until it was possible to detect an increase in the phosphorus hydride level in the gas chromatograph. The supply of the gas to be purified was now shut off and instead, a gentle stream of nitrogen was blown in which was then passed through a washer charged with sodium hypochlorite solution. On raising the temperature to about 90° C. in the purification station, now functioning as a regeneration station, the yellowish-orange precipitate that had formed gradually began to disappear and the phosphorus hydride thus liberated was discharged with the gas stream and eliminated in the downstream trapping station.

After it was no longer possible to detect any yellowish-orange color in the liquid, the stream of nitrogen was shut off, the temperature was reduced to 0° C. and the gas stream to be purified was reintroduced. After a short time the adduct formation, which was recognizable from the formation of an orange-red precipitate, set in; the gas stream monitored in the gas chromatograph was free of phosphorus hydride. It was possible to repeat this cycle several times without difficulties.

EXAMPLE 3

A quantity of 200 ml of titanium tetrachloride was introduced as the halide into the arrangement described in Example 2 under otherwise identical conditions. The gas stream to be purified was hydrogen containing a fraction of 400 ppm of phosphorus hydride. A solid, reddish-brown adduct was formed in the purification station, while it was not possible to detect any phosphorus hydride in the resulting gas stream by gas chromatography.

Both the purification step (temperature: 0° C.) and the

TABLE

| | Removal of phosphine from hydrogen containing phosphine | | | | |
|---|---|---|---|---|---|
| Halide supplied | Temperature of purification station (°C.) | Maximally bound $PH_3$ (mole/l) | $PH_3$ content before purification (ppm) | $PH_3$ content after purification (ppm) | Temperature of regeneration station (°C.) |
| $Si_2Cl_6$ | 20 | $1.3 \times 10^{-3}$ | 5,000 | <1 | 75 |
| 90 wt. % $Si_2Cl_6$ 10 wt. % $SiCl_4$ | −20 | $4.0 \times 10^{-3}$ | 10,000 | <1 | 65 |
| 70 wt. % $Si_2Cl_6$ 30 wt. % $SiCl_4$ | −40 | $5.7 \times 10^{-3}$ | 5,000 | <1 | 65 |

EXAMPLE 2

Approximately 200 ml of liquid tin tetrachloride were introduced into a temperature-controlled gas washer and adjusted to a temperature of approximately 0° C. A gas stream of hydrogen containing approximately 4.7% by volume of trichlorosilane and about 20,000 ppm of phosphorus hydride to be purified was bubbled through the liquid via a gas inlet tube with a frit plate. The residence time was approximately 1 sec in the liquid and approximately 10 sec in the gas phase of the purification station. The gas stream was then passed through a dry-ice condenser (condensing temperature approximately −78° C.), and also an absorber charged with sodium hydroxide pellets and an absorber charged with phosphorus pentoxide. The gas stream was then supplied to a gas chromatograph to detect the phosphorus hydride left behind. It was no longer possible to detect any phosphorus hydride with the gas chromatograph, i.e. the content was below the limit of detection of approximately 1 ppm.

In the purification station, a solid, yellowish-orange adduct began to form which dispersed itself in the liquid regeneration step (temperature: 80° C.) were carried out analogously to the process specified in Example 2 and it was possible to repeat them several times without difficulty.

EXAMPLE 4

Liquid trichlorosilane, to which approximately 5% by weight of a thermally untreated liquid high-boiler mixture composed mainly of silicon chlorides with 2-4 atoms of silicon in the molecule had been added, was introduced into a distillation column as the substance to be purified. The mixture was contaminated by passing a stream of hydrogen enriched with 0.5% by volume of phosphorus hydride through it for 20 minutes. In the subsequent distillation, the trichlorosilane was removed at the column head and was introduced, with the addition of hydrogen, into a test deposition installation where it was decomposed to deposit elementary silicon on a thin silicon ingot. The silicon obtained in this process had a specific resistance of 30 ohm·cm (n-type)

which corresponds to a phosphorus content of approximately $1.5 \times 10^{14}$ atoms of phosphorus/cm$^3$.

After the main fraction of trichlorosilane had been distilled off from the column, 3% by weight of thermally unpretreated high boiler was added to the bottom. The temperature in the bottom was then raised to approximately 85° C. to regenerate the high boiler and the phosphorus hydride liberated was removed from the column by means of a stream of nitrogen.

The column was then again charged with trichlorosilane through which a stream of hydrogen enriched with 0.5% by volume of phosphorus hydride had previously been passed at the same flow rate as in the preliminary experiment. The high-boiler fraction was again approximately 5% by weight. The trichlorosilane was removed in an analogous manner in the subsequent distillation and supplied for a test deposition. The silicon obtained had a specific resistance of 80 ohm·cm (n-type), corresponding to a phosphorus content of $5.2 \times 10^{13}$ atoms of phosphorus/cm$^3$. This is equivalent to a reduction in the degree of contamination by about 65%.

While several embodiments and/or examples of the present invention have been described, it will be obvious that many changes and modifications may be made thereonto without departing from the spirit and scope of the invention.

What is claimed is:

1. A process for removing n-type doping impurities from liquid or gaseous substances produced in the gas-phase deposition of silicon comprising the steps of:

passing the liquid or gaseous substances through a purification station where the liquid or gaseous substances are brought into contact with halides of at least one element selected from the group consisting of silicon, titanium, tin and a combination thereof, whereby adducts are formed containing the impurities;

transferring said halides from said purification station to a regeneration station prior to or at the point when said halides are saturated with said adducts;

regenerating at least part of said halides in said regeneration station by treating said halides at predetermined temperatures to at least partially dissociate said adducts to liberate the impurities; and transferring said at least part of said halides regenerated to said purification station.

2. The process as set forth in claim 1, wherein fresh halides of at least one element selected from the group consisting of silicon, titanium, tin and a combination thereof are added to the at least part of said halides regenerated in said regeneration station and transferred to said purification station.

3. The process as set forth in claim 1, wherein silicon chlorides with at least 2 atoms of silicon in the molecule are used as said halides.

4. The process as set forth in claim 1, wherein liquid silicon chlorides are used as said halides.

5. The process as set forth in claim 4, wherein silicon tetrachloride is added to said silicon chlorides.

6. The process as set forth in claim 1, wherein the halides are applied to a solid carrier substance.

7. The process as set forth in claim 1, wherein said purification station is maintained at a temperature not exceeding 40° C.

8. The process as set forth in claim 1, wherein said halides are brought to a temperature of at least 60° C. in the regeneration station.

9. The process as set forth in claim 1, wherein said halides supplied are subjected to said predetermined temperatures in said regeneration station before said halides reach the saturation content of adducts.

10. The process as set forth in claim 1, wherein the impurities liberated in said regeneration station are introduced into a trapping station downstream of said regeneration station.

* * * * *